United States Patent [19]

Henry

[11] Patent Number: 5,434,782
[45] Date of Patent: Jul. 18, 1995

[54] SUSPENSION SYSTEM STATE OBSERVER

[75] Inventor: Rassem R. Henry, Mt. Clemens, Mich.

[73] Assignee: General Motors Corporation, Detroit, Mich.

[21] Appl. No.: 702,875

[22] Filed: May 20, 1991

[51] Int. Cl.$^6$ ............................................... B60G 3/00
[52] U.S. Cl. ............................... 364/424.05; 280/707; 280/709; 280/840
[58] Field of Search ...................... 364/424.05, 424.01; 280/707, 711, 689, 709, 84, 840, 714, 708, 6.1

[56] References Cited

U.S. PATENT DOCUMENTS

| | | | |
|---|---|---|---|
| 2,850,290 | 9/1958 | Borgmann | 280/112 |
| 3,278,197 | 10/1966 | Jacques Jean-Marie Jules Gerin | 280/124 |
| 3,858,902 | 1/1975 | Howells et al. | 280/124 R |
| 3,941,402 | 3/1976 | Yankowski et al. | 280/124 R |
| 4,468,050 | 8/1984 | Woods et al. | 280/707 |
| 4,468,739 | 8/1984 | Woods et al. | 364/424 |
| 4,544,868 | 10/1985 | Murty | 318/254 |
| 4,579,366 | 4/1986 | Doi et al. | 280/707 |
| 4,606,440 | 8/1986 | Buchanan, Jr. et al. | 188/319 |
| 4,634,142 | 1/1987 | Woods et al. | 280/707 |
| 4,696,489 | 9/1987 | Fujishiro et al. | 280/707 |
| 4,700,971 | 10/1987 | Doi et al. | 280/707 |
| 4,722,548 | 2/1988 | Hamilton et al. | 280/707 |
| 4,770,438 | 9/1988 | Sugasawa et al. | 280/707 |
| 4,809,179 | 2/1989 | Klinger et al. | 364/424.05 |
| 4,815,575 | 3/1989 | Murty | 188/299 |
| 4,902,034 | 2/1990 | Maguran et al. | 280/707 |
| 4,907,154 | 3/1990 | Yasuda et al. | 364/424.05 |
| 4,909,534 | 3/1990 | Fukushima et al. | 280/707 |
| 4,916,632 | 4/1990 | Doi et al. | 364/508 |
| 4,937,748 | 6/1990 | Yonekawa et al. | 364/424.05 |
| 4,977,506 | 12/1990 | Hara et al. | 364/424.05 |
| 5,062,657 | 11/1991 | Majeed | 364/424.05 |
| 5,062,658 | 11/1991 | Majeed | 280/707 |
| 5,071,157 | 12/1991 | Majeed | 280/707 |
| 5,072,965 | 12/1991 | Wada et al. | 280/707 |
| 5,091,679 | 2/1992 | Murty et al. | 318/153 |
| 5,096,219 | 3/1992 | Hanson et al. | 280/707 |
| 5,097,419 | 3/1992 | Lizell | 364/424.05 |
| 5,175,686 | 12/1992 | Oda et al. | 364/424.05 |
| 5,203,584 | 4/1993 | Butsuen et al. | 280/707 |
| 5,214,596 | 5/1993 | Müller | 364/565 |

FOREIGN PATENT DOCUMENTS

| | | |
|---|---|---|
| 0363158 | 11/1990 | European Pat. Off. . |
| 2594755 | 8/1987 | France . |
| 1111515 | 4/1989 | Japan . |

OTHER PUBLICATIONS

Coast Computer Controlled Suspension System, Aimrite Systems International.

Alexander A. Alexandridis; Trudy R. Weber, Active Vibration Isolation of Truck Cabs, 1984 American Control Conference, Sand Diego, Calif., Jun. 6–8, 1984.

Majeed, K., Dual Processor Automotive Controller, Proceedings of the IEEE/Application of Automotive Electronics, Dearborn, Mich., Oct. 19, 1988.

Karnopp, D. Crosby, M., Harwood, R., Vibration Control Using Semi–Active Force Generators, ASME.

Sunwoo, M., Cheok, K., An Application of Explicit Self-Tuning Controller to Vehicle Active Suspension Systems, Twnety–ninth IEEE Conference on Decision in Control, Hawaii, Dec. 1990.

Ogata, K., Modern Control Engineering, Prentice–Hall, Inc., N.J. 1970, Chapters 14–15.

*Primary Examiner*—Kevin J. Teska
*Assistant Examiner*—Jacques H. Louis-Jacques
*Attorney, Agent, or Firm*—Anthony Luke Simon

[57] ABSTRACT

A suspension system controller uses both linear and nonlinear relations to develop the suspension system state estimation. The linear components include (i) a component linearly related to the previous suspension system state estimation, (ii) a component linearly related to damping or actuator force in the suspension system, (iii) a component linearly related to error between the previously estimated relative suspension system state and measured relative system state and (iv) a component non-linearly related to error between the previously estimated relative system state, the linear and nonlinear components must all be stable, so that the estimated system state tends toward the actual system state. The controller controls the suspension system responsive to the suspension system state estimation.

8 Claims, 11 Drawing Sheets

SUSPENSION SYSTEM STATE OBSERVER

This invention relates to vehicle suspension systems and more particularly to a method and an apparatus for determining suspension system state, and using that state for actuator control of variable force semi-active and active quarter car suspensions. The subject of this application is related to following copending patent applications: "Quarter Car Variable Force Suspension System Control," and "Full Car Semi-Active Suspension Control Based on Quarter Car Control," both filed concurrently with this specification and assigned to the assignee of this invention. The disclosures of patent applications are incorporated into this document by reference.

BACKGROUND OF THE INVENTION

In the field of vehicle suspensions, the phrase "quarter car suspension" refers to the components of the vehicle suspension relating to one of the four wheels of the typical automotive vehicle. These components include the particular wheel with a tire that is in contact with the road, a spring that transfers the road force to the vehicle body (sprung mass) and suspends the vehicle body, and a damper or actuator that reduces undesirable relative movement between the vehicle body and wheel. The complete suspension system of an automotive vehicle comprises four quarter car suspensions.

In recent years, vehicle manufacturers have dedicated significant effort to developing suspension systems responsive to the driving conditions of the vehicle. This effort is triggered by a desire to incorporate the best features of soft and stiff suspension systems into a single vehicle suspension system. The best feature of a soft suspension is the smooth ride it provides for the vehicle passengers. The best feature of a stiff suspension is the increased handling performance it provides for the vehicle.

The theory of semi-active suspension systems is to selectively switch between stiff suspension and soft suspension in response to the particular road and driving conditions of the vehicle. Selection between stiff suspension and soft suspension may be obtained by altering the damping force of the suspension system, e.g., a greater damping force for a stiffer suspension and a lower damping force for a softer suspension. With correct control of suspension damping force, a vehicle can provide both optimum driving comfort and optimum handling performance.

The theory of active suspension system controls is to provide an actuator force to the suspension system to reduce wheel hop and improve vehicle body attitude control beyond that achievable by damping forces alone. The actuator force is applied in equal and opposite directions between the wheel and vehicle body. Active and semi-active suspension systems can be commonly referred to as variable force suspension systems.

Difficulties in designing variable force suspension systems lie partially in system controls. A suspension system may, at any given time, be said to have a state. The suspension system state for a particular quarter of the vehicle includes the position of the vehicle body (the sprung mass), the position of the wheel (the unsprung mass), the velocity of the sprung mass, and the velocity of the unsprung mass. From these four components, the other characteristics of the quarter car suspension system may be determined. For example, the relative velocity between the sprung mass and the unsprung mass is equal to the velocity of the sprung mass subtracted by the velocity of the unsprung mass. The relative position of the sprung mass and unsprung mass is equal to the position of the sprung mass subtracted by the position of the unsprung mass. The relative velocity between the sprung and unsprung masses and/or the relative position of the sprung and unsprung masses may be included in what is referred to below as the relative system state.

The state of the suspension system is difficult to predict because the road surface is always changing and is, itself, not predictable. Directly measuring the suspension system state requires many sensors, and is difficult to do. What is desired is a controller for a variable force suspension system that (i) estimates the suspension system state based on as few sensors as possible, while keeping the error between the actual and estimated state within reasonable limits, and that (ii) controls the suspension system in response to the estimated state.

SUMMARY OF THE PRESENT INVENTION

The present invention provides an apparatus and a method for accurately estimating the state of a quarter car suspension system and for using the estimated state in the suspension system control. This invention can maintain accurate state estimations despite variations in parameters of the suspension system, e.g., aging of suspension system components and variance of vehicle load, thereby allowing for improved suspension system control.

The observer of this invention uses both linear and nonlinear relations to develop the suspension system state estimation. The linear components include (i) a component linearly related to the previous suspension system state estimation, (ii) a component linearly related to damping or actuator force in the suspension system, and (iii) a component linearly related to error between the previously estimated relative suspension system state and measured relative system state. The nonlinear component is non-linearly related to error between the previously estimated relative system state and measured relative system state. The linear and nonlinear components must all be stable, so that the estimated system state tends toward the actual system state. The suspension system controller controls the suspension system responsive to the estimated system state.

This invention may be implemented in four quarter car suspensions on a vehicle, and may be integrated with other control routines, such as in the copending application for additional vehicle suspension system control.

DETAILED DESCRIPTION OF THE INVENTION

Figure 1:
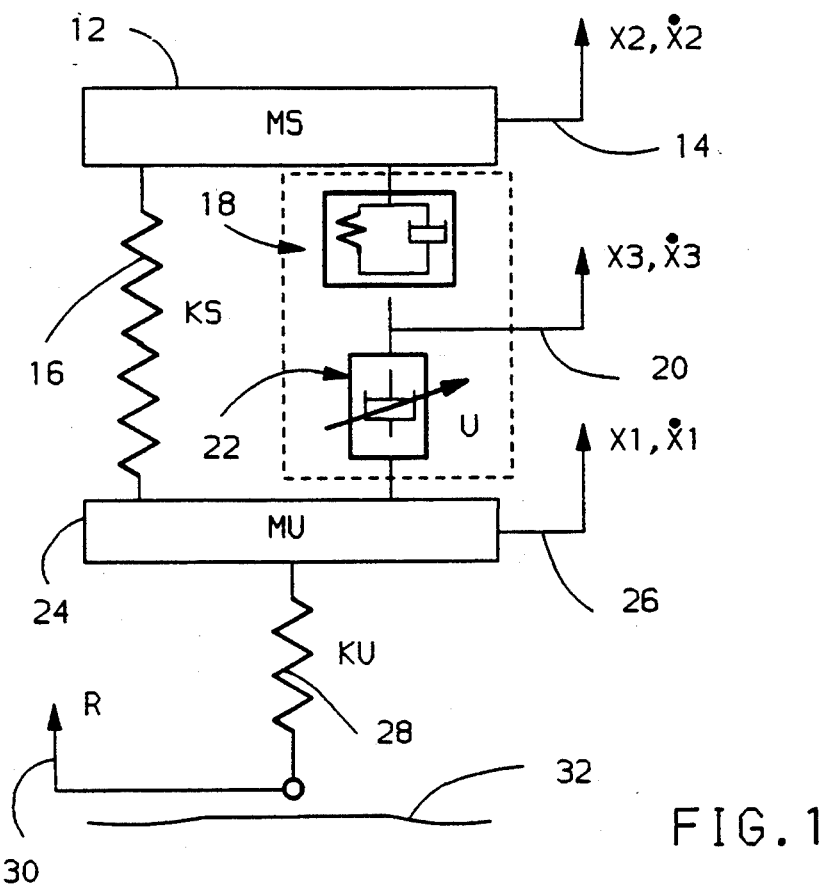
FIG. 1 is an equivalent schematic diagram of a variable force quarter car suspension.

A suspension system of the type in which this invention may be implemented to observe and control may be understood with reference to the model diagram of FIG. 1. In the Figure, reference numeral 12 generally designates the sprung mass, having mass $M_s$, which is the vehicle body supported by the suspension. The sprung mass has a position, $x_2$, and a velocity, $x_2$, both represented by line 14. The sprung mass 12 is supported by the spring 16, having a constant $k_s$. The spring is also connected to the unsprung mass 24, which represents the vehicle wheel. The unsprung mass 24, having mass $M_u$, has a position, $x_1$, and a velocity, $x_1'$, both represented by line 26. The tire of the vehicle is modeled as a spring 28, having a spring constant $k_u$. The road is represented by reference numeral 32 and affects a displacement R (line 30) on the tire 28.

Variable force between the sprung and unsprung masses 12 and 24 is provided in the suspension system by actuator 22. Actuator 22 may be an adjustable damper, for semi-active systems, or an actuator capable of both damping and providing a force independent of damping on the suspension system. Actuator 22 may be an electromechanical machine, including a linear electromechanical machine, hydraulic shock with a flow control or bypass valve, or any other means of providing variable force to the suspension. The actuator 22 is attached between the unsprung mass 24 and a rubber bushing 18, which is modeled as a nonlinear spring in parallel with a damper. Rubber bushing 18 is similar to bushings used in engine mounts and is optional. If the rubber bushing 18 is omitted, the actuator 22 is attached directly to the sprung mass 12. In general, the actuator 22 exerts a force on the unsprung mass 24 and an equal and opposite force on the sprung mass 12, through rubber bushing 18, in proportion to the relative speed of the sprung and unsprung masses and/or an input control signal.

In the suspension system, the road 32 affects a displacement R on the tire 28, which in turn applies a force on the unsprung mass 24. The unsprung mass 24 transfers force to the spring 16 which in turn applies force on the sprung mass 12. The actuator 22 applies force on the sprung mass 12 (through bushing 18, if used) and unsprung mass 24; in the semi-active case, the force is applied in the direction opposite the relative direction of travel of the two masses, in the active case, the force may be in the same direction or opposite the direction of travel of the two masses. The bushing 18 is optional but may be preferable to help reduce the effect of high frequency road surface disturbance on the system. In the model of the suspension system set forth below, the effect of the rubber bushing is ignored and accounted for as a system uncertainty. Suspension systems of the type represented by FIG. 1 are easily implemented by those skilled in the art.

Figure 2:
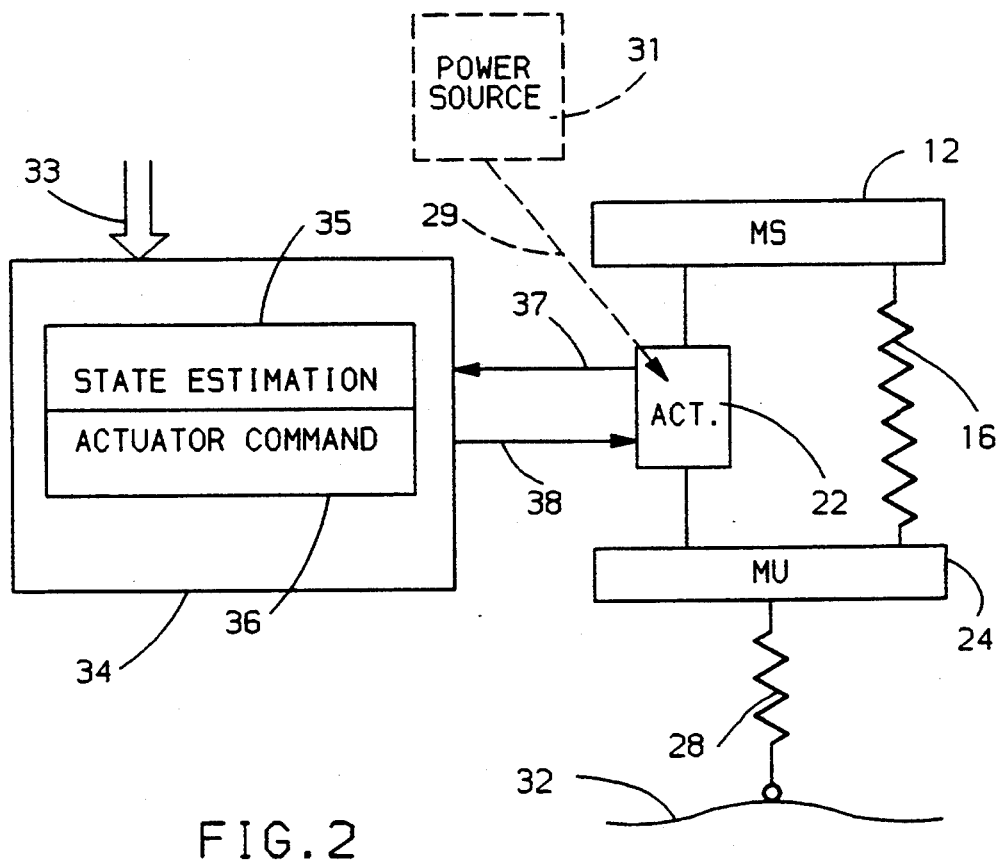
FIG. 2 is a schematic diagram of the apparatus of this invention.

Referring to FIG. 2, the apparatus of this invention includes the controller 34 comprising a state estimator 35 (also referred to as the observer) and an actuator command generator 36. The controller 34 receives a signal on line 37 representative of the relative system state. The signal on line 37 may be developed by actuator 22 or an independent sensor, such as a LVDT (not shown). In response to the signal on line 37 and previous state estimations, the state estimator 35 estimates the current suspension system state. The actuator command generator 36 develops a command for actuator 22 in response to the state estimation and provides that command on line 38.

The actuator 22 may either be a variable force damper of the type used in semi-active systems or a variable force actuator of the type which applies force to the suspension system from an outside power source, such as in active systems. Actuator 22 may be a damping electromechanical actuator which variably generates and dissipates power, a damping hydraulic actuator with means for variable flow control, an electromechanical actuator to which power may be supplied, or a hydraulic actuator with power supplied by a source of pressurized hydraulic fluid. Examples of each of these forms of actuators are available to those skilled in the art. Box 31 represents a power source for supplying energy, e.g., in the form of electric current or hydraulic pressure, through line 29, to actuator 22, for use in active systems.

The bus 33 represents signals of various other vehicle parameters that may, at times, be taken into account to develop the actuator command at box 36. These signals may include semi-rigid body characteristics of a vehicle body and example implementations are set forth in detail below.

Figure 3:
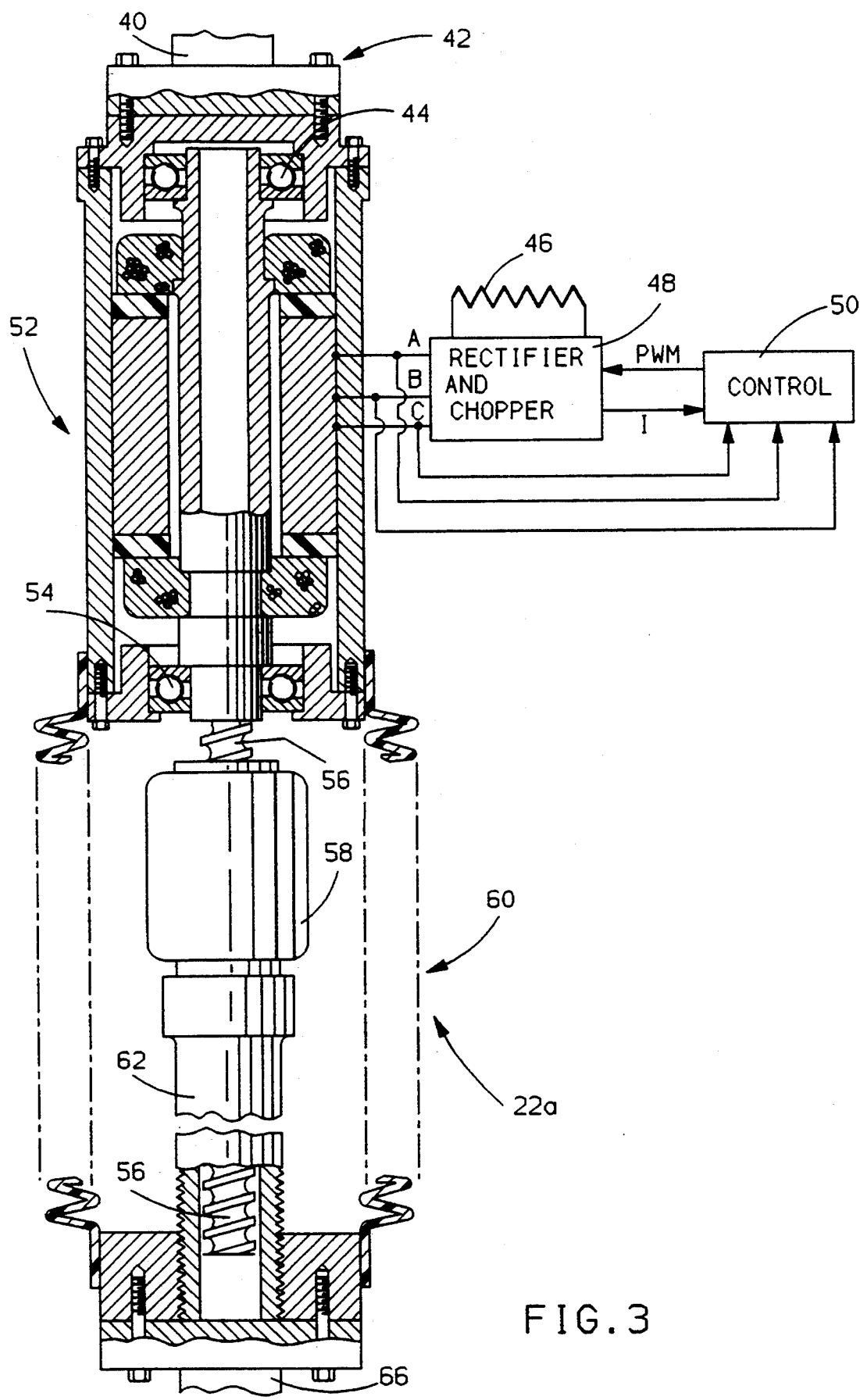
FIG. 3 is an example damper for a quarter car semi-active suspension system.

Referring to FIG. 3, one example of the actuator 22 may be the unit 22, including an electromechanical machine 42. In the Figure, the electromechanical machine 42 comprises a linear to rotary motion converter 60 and a rotary multi-phase alternator 52. The linear to rotary motion converter 60 includes a ball screw cage 58, hollow connector 62, screw 56 and lower connector 66. The rotary multi-phase alternator 52 is rotatably mounted through bearings 44 and 54 to the upper connector 40. The lower connector 66 is mounted to the unsprung mass 24 (FIG. 1) and the upper connector 40 is mounted to the sprung mass 12 (FIG. 1), through rubber bushing 18, if used.

Through the relative movement of the sprung mass 12 and the unsprung mass 24 acting on the connectors 40 and 66, the ball screw 56 is forced to rotate, rotating the rotary multi-phase alternator 52 and creating electric potential on lines A, B, and C, which are connected to the rectifier and chopper apparatus 48. In response to the controller 50, which generates a pulse width modulated control signal on line PWM, the rectifier and chopper 48 selectively dissipates the power generated by alternator 52 through load resistor 46, providing the damping force for actuator 22. During high frequency movements of the unsprung mass 24, e.g., on a very bumpy road, the rubber bushing 18 (FIG. 1) attenuates the inertial effect of actuator 22 on the suspension system performance. Optionally, the actuator 22a may be used as a brushless DC motor by including hall effect sensors 344, 362 and 366 (FIG. 12) and used with an inverter circuit 390 (also in FIG. 12). When used as a brushless motor, actuator 22a can not only dampen the suspension system, but apply a force between the sprung and unsprung masses 12 and 24, both counter to and in the direction of travel of the two masses (damping force can only be opposite the relative direction of travel of the two masses 12 and 24). Another option is to use a linear electromechanical actuator.

Figure 4:
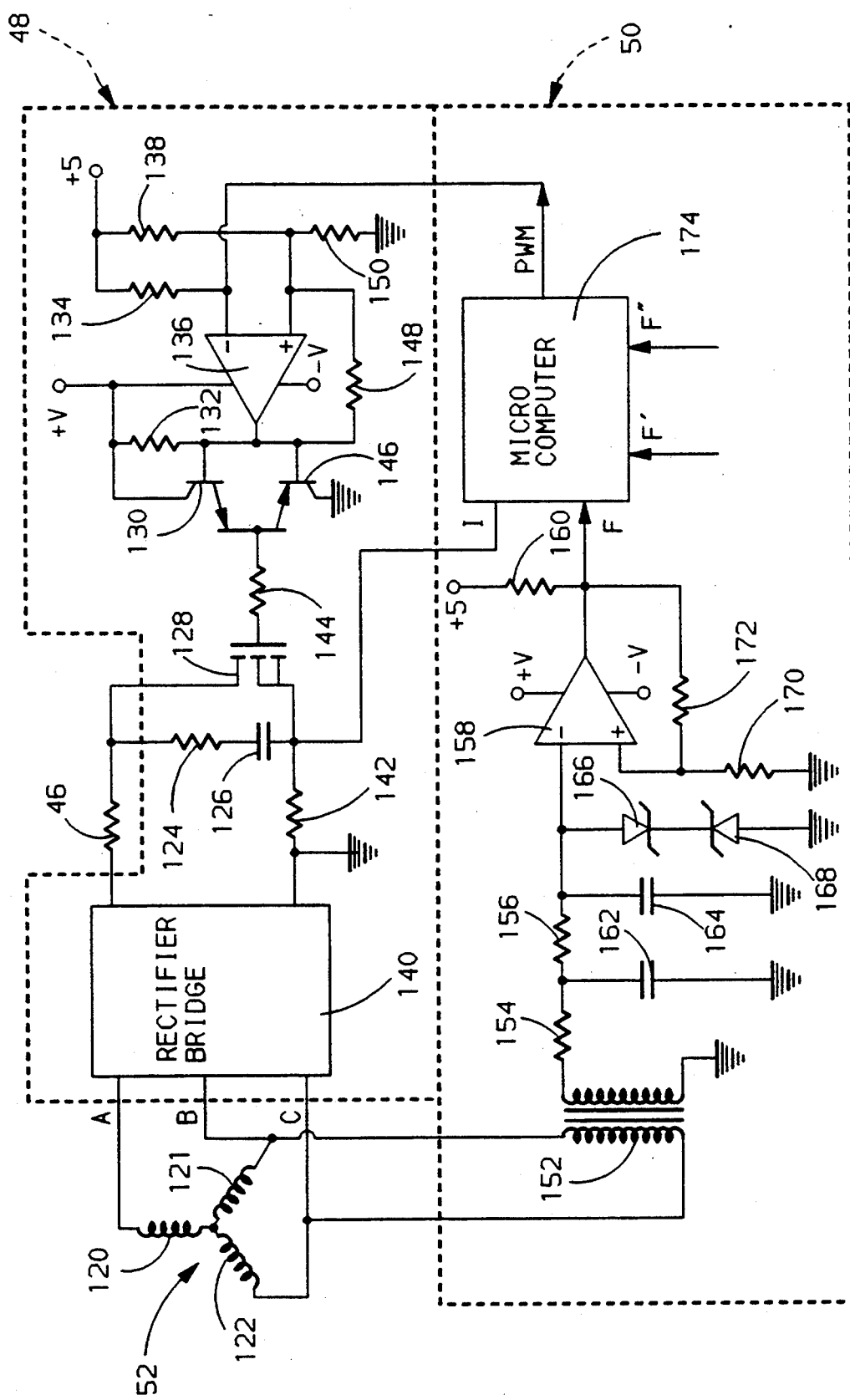
FIG. 4 is a schematic diagram of example circuitry for semi-active suspension system control.

The rectifier and chopper 48 and the controller 50 can be better understood with reference to FIG. 4. Coils 120, 121, and 122 of the alternator 52 are connected to a rectifier bridge 140 which rectifies the three phase voltage on lines A, B, and C. In response to a control signal on line PWM, the circuit comprising operational amplifier 136, transistors 130 and 146, and resistors 132, 134, 138, 144, 148, and 150 control MOSFET 128, selectively closing a DC circuit between resistors 46 and 142, dissipating the power generated by alternator 52. The duty cycle of the signal on line PWM determines the amount of damping force. Example values for the resistors and capacitor are as follows: resistor 46, 1.67 Ω, 150 W; resistor 142, 2 mΩ; resistor 124, 50 Ω; capacitor 33, 0.1 uF; resistors 134, 138, and 150, 10K; resistor 148, 100K; resistor 132, 1.5K; and resistor 144, 100 Ω.

Line I may be implemented as an option to provide a damping force feedback loop for electromechanical implementations. There will probably be sufficient inductance in the circuit of alternator 52, rectifier bridge 140 and load resistor 46 that the duty cycle modulation of MOSFET 128 produces an average DC current with a small ripple. If so, the current signal I read into microcomputer 174 is already averaged. If any additional averaging is required, it can be done with a standard digital averaging algorithm in microcomputer 174 applied to successive values of I.

As will be explained below, it is desirable for successful implementation of this invention to detect the relative velocity of the sprung and unsprung masses 12 and 24, otherwise known as the rattle space velocity, or the relative position of the sprung and unsprung masses 12 and 24. Either implementation is acceptable.

The rattle space velocity may be determined a variety of ways. One implementation is to determine the frequency of the zero crossings of the voltages on lines A, B, and C.

The circuit comprising transformer 152, operational amplifier 158, resistors 154, 156, 160, 170, and 172, capacitors 162 and 164, and zener diodes 166 and 168 provide a pulse to the microcomputer 174 on line F with every zero crossing of the voltage between lines B and C. Preferably, identical circuits are connected between lines A and C and between lines A and B to provide zero crossing pulses on lines F' and F''', respectively. The frequency of the signals on lines F, F' and F'' determines the magnitude of the rattle space velocity and the direction of the rattle space velocity is determined by the order of the signals on lines F, F' and F'''. The calculation of the rattle space velocity is performed by microcomputer 174 through a computer routine easily implemented by one skilled in the art. Example values for the capacitors and resistors are: resistors 154, 156 and 170, 10K; capacitor 162, 0.0015 uF; capacitor 164, 0.33 uF; resistor 160, 3K; and resistor 172, 470K. A more detailed description of the actuator 22 and related circuitry is set forth in U.S. Pat. No. 4,815,575, to Murty, assigned to the assignee of this invention, and will not be set forth herein.

If the relative position of the sprung and unsprung masses 12 and 24 is to be determined, an LVDT-type sensor (not shown) is attached between the sprung and unsprung masses 12 and 24. The LVDT sensor provides an output signal linearly related to distance between the sprung and unsprung masses and the output signal is provided to an A/D converter (not shown), the output of which is connected to the microcomputer 174 for processing. Any other suitable position sensor may alternatively be used.

In implementation with the actuator 22, this invention provides a state observer to be used in a control routine for microcomputer 174 to improve the performance of actuator 22 in a semi-active quarter car suspension system. To provide optimal actuator control and suspension system performance, it is desirable to know the entire state of the system. The entire state of the system comprises the positions and velocities of the sprung and unsprung masses (ignoring the rubber bushing 18). As stated above, the relative state of the suspension system, including the relative velocity of the sprung and unsprung masses and/or the relative position of the sprung and unsprung masses is easily derived from the system state. In the case where the rubber bushing 18 is ignored, the system state may be set forth as a vector X as follows:

$$X = \begin{pmatrix} x_1 \\ x_1' \\ x_2 \\ x_2' \end{pmatrix},$$

where $x_1$ and $x_1'$ are the position and velocity of the unsprung mass 24 (FIG. 1) and $x_2$ and $x_2'$ are the position and velocity of the sprung mass 12. The positions of the unsprung and sprung masses 24 and 12 are preferably determined relative to an at rest position for the system.

To dispense with the expensive requirement of separate sensors to measure each component of the quarter car system state along with the difficulties in obtaining absolute state measurements, this invention provides a means for estimating the entire system state requiring the input of only one sensor which measures the relative system state. The single sensor may be a sensor that measures the relative velocity of the sprung and unsprung masses 12 and 24 or the relative position of the masses 12 and 24. One example of a sensor for measuring the relative velocity is the inherent inductance of the actuator 22 described above with reference to FIG. 4, providing the pulses on lines F, F' and F''. Another example of a sensor for measuring the relative velocity is to include three Hall effect sensors in the actuator 22a (see, e.g. FIG. 12) and to determine relative velocity according to the frequency and direction of signals provided by the Hall effect sensors. One example of a sensor for measuring the relative position is an LVDT sensor (readily available to those skilled in the art) attached to the sprung and unsprung masses 12 and 24.

When the sensor to measure the relative system state measures the relative velocity between the sprung and unsprung masses 12 and 24, the estimated relative system state includes an estimation of the relative velocity between the sprung and unsprung masses 12 and 24. when the sensor to measure the relative system state measures the relative position between the sprung and unsprung masses 12 and 24, the estimated relative system state includes an estimation of the relative position between the sprung and unsprung masses 12 and 24. It is preferable to measure relative position to minimize the effect of error integration.

Figure 5A:
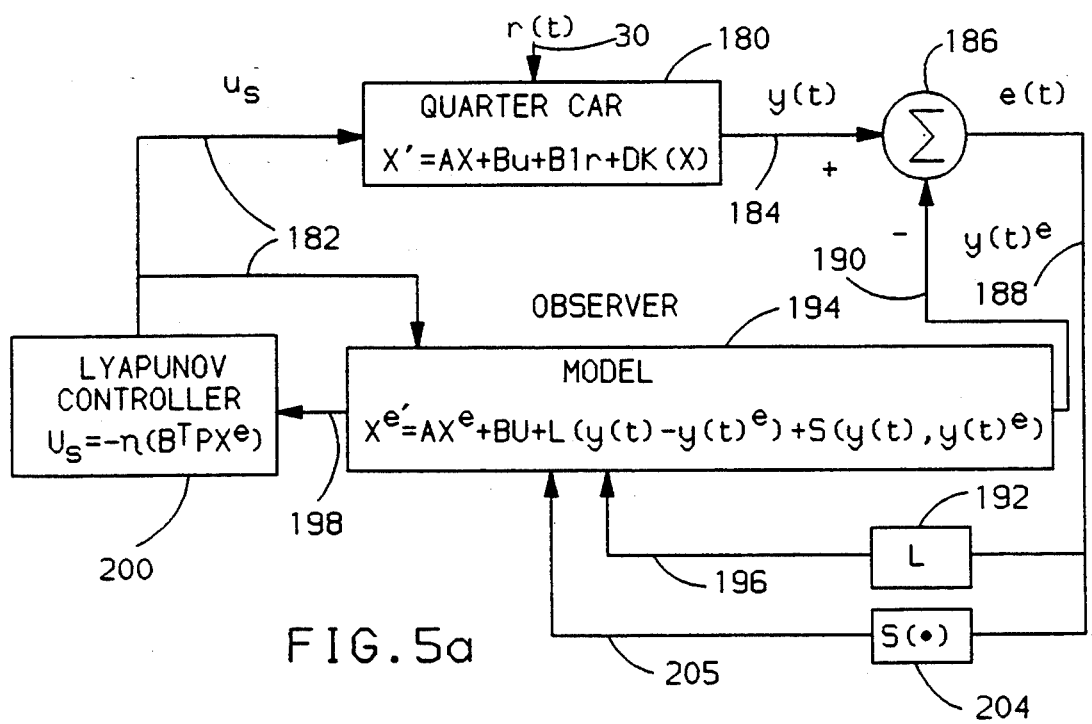
FIGS. 5a and 5b are schematic diagrams of controllers using alternative embodiments of this invention.

One example implementation of this invention includes the observer 194 shown in FIG. 5a including a linear Luenberger term and a nonlinear signum term. The observer 194 estimates the entire system state $X^{e'}$ (comprising $x_1^e$, $x_1^{e'}$, $x_2^e$ and $x_2^{e'}$) and computes the estimated relative system state, $y^e(t)$. The estimated system state $X^{e'}$ is computed according to the following model:

$$X^{e'} = AX^e + Bu + L(y(t) - y^e(t)) + S(y(t), y^e(t)),$$

where A and B are standard model matrices for a suspension system with control, $X^e$ is the previous estimated system state, u is the control (representing the actuator force of actuator 22), L is a linear Luenberger matrix that provides stabilizing linear feedback (the function $L(y(t) - y^e(t))$ is referred to below as the linear correction term), y(t) is the measured relative system state of the sprung and unsprung masses 12 and 24, and $S(y(t), y^e(t))$, the nonlinear correction term, is the non-linear signum function term, allowing for accurate estimations within a defined error limit. For purposes of simplification of the model, the characteristics of the rubber bushing 18 (FIG. 1) are not modeled, but accounted for by the non-linear term as error. The estimated relative system state, $y^e(t)$, is related to the state, $X^e$, as follows:

$$y^e(t) = CX^e,$$

where the matrix C is a standard suspension system model matrix.

The matrix A is a standard suspension model matrix easily implemented by one skilled in the art as follows:

$$A = \begin{pmatrix} 0 & 1 & 0 & 0 \\ a_1 & a_2 & a_3 & a_4 \\ 0 & 0 & 0 & 1 \\ a_5 & a_6 & a_7 & a_8 \end{pmatrix}.$$

In implementing the model, those skilled in the art realize that the model parameters of matrix A, in a damper where inertial effects are significant, are as follows:

$a_1 = (j^2(k_s M_u - jn^2 k_u) - (k_u + k_s)c_1)/((M_u + jn^2)c_1);$ $a_2 = (jn^2 b_p M_u - c_1 b_p)/((M_u + jn^2)c_1);$ $a_3 = (c_1 k_s - jn^2 k_s M_u)/((M_u + jn^2)c_1);$ $a_4 = (c_1 b_p - jn^2 b_p M_u)/((M_u + jn^2)c_1);$ $a_5 = (k_s M_u - jn^2 k_u)/c_1;$ $a_6 = b_p M_u/c_1;$ $a_7 = -k_s M_u/c_1;$ $a_8 = -b_p M_u/c_1,$ where bp is the passive damping force on the system, e.g., when zero power is being dissipated in resistor 46 of actuator 22 above, j is the rotary inertia of the electromechanical machine 52, n is the gear ratio, and $c_1$ equals the quantity $(M_u M_s + jn^2(M_u + M_s))$.

The matrix B is as follows:

$$B = \begin{pmatrix} 0 \\ b_1 \\ 0 \\ b_2 \end{pmatrix},$$

where, for the system where inertial effects are significant, $b_1 = (jn_2 M_u - c_1)/((M_u + jn^2)c_1)$ and $b_2 = M_u/c_1$. If the relative system state is to comprise the relative velocity between the sprung and unsprung masses 12 and 24, the matrix C may be described as $C = [0 \ 1 \ 0 \ -1]$, so that $y^e(t) = x_1^{e'} - x_2^{e'}$. If the relative system state is to comprise the relative position between the sprung and unsprung masses 12 and 24, the matrix C may be described as $C = [1 \ 0 \ -1 \ 0]$, so that $y^e(t) = x_1^e - x_2^e$.

The Luenberger matrix L is generally solved for by determining a stable point for matrix $[A - LC]$, with its poles placed anywhere on the left hand plane of the real-imaginary coordinate system provided that the pair (A, C) is observable. Those skilled in the art of state estimation can easily implement the Luenberger matrix with the limitations set forth above.

The first three terms of the model $(AX^e + Bu + L(y(t) - y^e(t)))$ are a linear estimation of the system state. However, because of the difficulty of measuring the absolute displacement of the suspension system, the nonlinear mount, the system uncertainties, and the unknown road disturbances, the linear equation alone cannot converge the estimated system state to the actual system state. To ensure accurate estimations of $X^{e'}$, a signum function, $S(y(t), y^e(t))$, is added. $S(y(t), y^e(t))$ compensates for road disturbance, system uncertainties, non-linearities in the system, if any, and errors in the estimation model.

The signum function is defined as:

$$S(y(t), y^e(t)) = -P^{-1}C^T(y(t) - y^e(t))\sigma/||y(t) - y^e(t)||,$$

where $C^T$ is the transpose of matrix C, P is the solution of the Lyapunov equation $[A - LC]^T P + P[A - LC] = -Q$ (Q being any positive definite matrix), and $\sigma$ is determined from the modified matching condition described below.

Normally, the system would have zero error if the matching condition:

$$g = P^{-1}C^T g,$$

is satisfied. In the above equation, g is the sum of the effect of the road disturbance and nonlinear mount on the system, e.g., $g = ER + f(X, t)$, where ER is the effect of road disturbance on the system and f(X, t) is the effect of the nonlinear mount 18 (FIG. 1) and parameter uncertainties on the system. The above matching condition cannot be satisfied due to the nature of the problem. However, if instead of converging the estimated system state $X^e$ to the actual state X, the estimation is, according to one aspect of this invention, converged within a circle defining an acceptable error deviation from the actual state, e.g., circle with radius $||\Delta AX||$, the matching condition can be satisfied. $\Delta A$ is determined to allow for the parameter uncertainties of the system model and errors of the estimated states. $\Delta A$ is easily determined by one skilled in the art. With $\Delta A$ considered in the model, the Luenberger matrix, L, is solved for so that the matrix $[A-\Delta A-LC]$ is stable.

To achieve the error limit, define $P_2$ as the solution of the equation:

$$[A-\Delta A-LC]^T P_2 + P_2[A-\Delta A-LC] = -Q.$$

and adjust Q until the new matching condition:

$$g = P_2^{-1} C^T \bar{g},$$

is satisfied. This is easily accomplished by one skilled in the art. Once the new matching condition is satisfied, $\sigma$ is defined such that:

$$\sigma \geq MAX||\bar{g}||.$$

Referring to FIG. 5a, the state estimation by the observer 194 can be easily understood. The road disturbance on line 30 and the actuator force on line 182 affect the quarter car suspension system, represented by block 180, such that an actual relative system state, y(t), on line 184 is developed. At block 186, the estimated relative system state, $y^e(t)$, is compared to the actual relative system state, and an error signal, $e(t) = y(t) - y^e(t)$, on line 188, is developed. The error signal on line 188 is multiplied by the Luenberger matrix L at box 192 and the result is added with the rest of the estimation model in block 194. The error signal on line 188 is also input into the nonlinear function box 204 where the nonlinear signum function $S(y(t), y^e(t))$ is determined and added with the rest of the estimation model in block 194.

Figure 12:
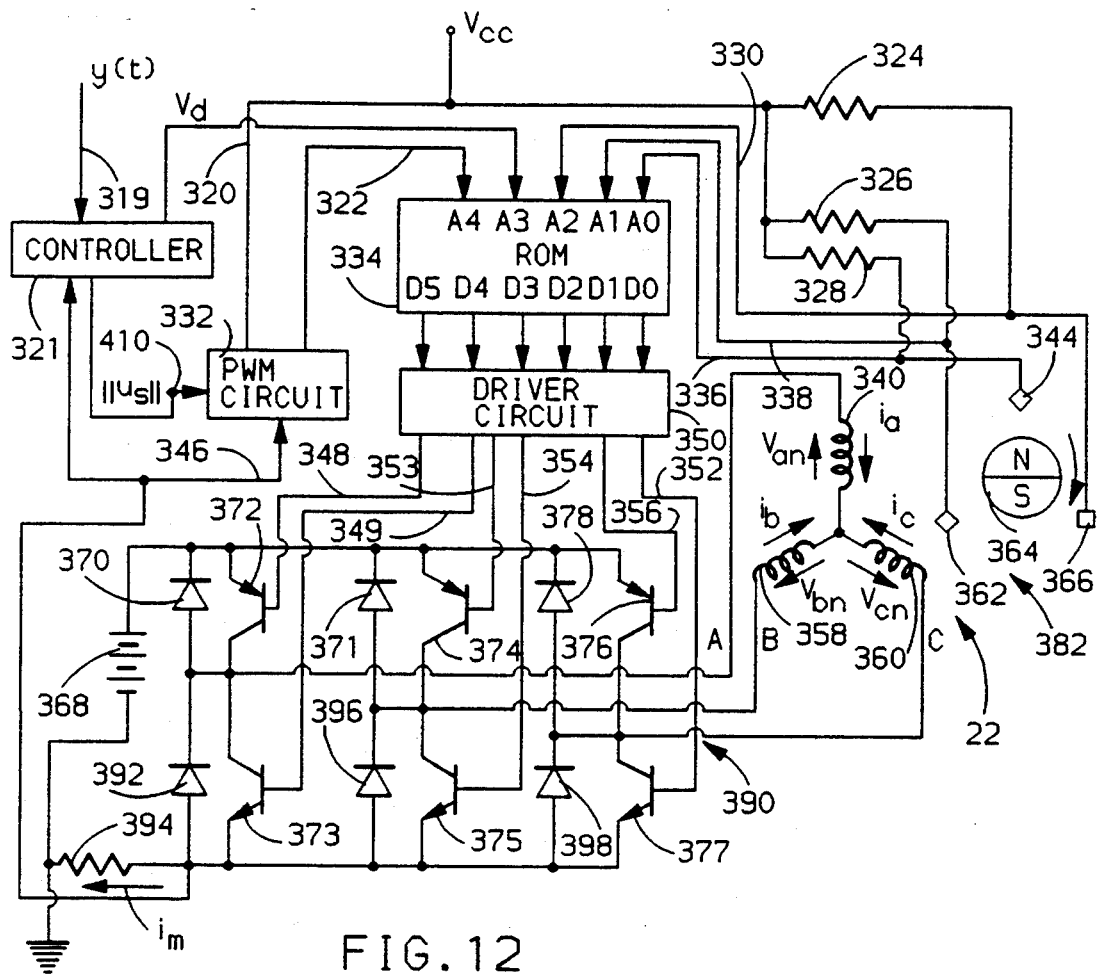
FIGS. 12 and 13 are diagrams for a circuit useful for controlling an electromechanical actuator in an active suspension system according to this invention.

A signal representative of the actuator force command, $u_s$, from the controller 200 is input into block 194 through line 182 (optional). The system actuator force, u, is determined at block 194 through one of a variety of different means. The actuator force, u, may be determined in relation to a signal such as on line I in FIG. 4. Alternatively, the actuator force, u, may be determined from a three dimensional look-up table with reference to y(t) and the controller command, $u_s$, described below. In the active case, actuator force, u, may be determined in relation to current $i_m$ through resistor 394 (FIG. 12). In block 194, the estimations $X^{e'}$ and $y^e(t)$ are determined as described above and output on lines 198 and 190, respectively.

Block 200 is a modified Lyapunov controller and represents one example of how this invention may be used for suspension system control. The modified Lyapunov controller 200 controls the actuator force (line 182) of the quarter car system in response to the estimated state $X^e$ on line 198 in a manner to drive the state to a reference condition.

The typical Lyapunov controller is a two state minmax controller. However, the modified Lyapunov controller, which is the subject of copending application Attorney Docket Number G-2343 and is preferred for use with this invention, has the following control function:

$$u_s = -\begin{cases} 0, & ||B^T P X^e|| \leq \epsilon_d \\ (B^T P X^e)\rho/||B^T P X^e||, & ||B^T P X^e|| \geq \epsilon, \\ (B^T P X^e - ||B^T P X^e||\epsilon_d/(B^T P X^e))\rho/(\epsilon - \epsilon_d), \\ & \epsilon_d < ||B^T P X^e|| < \epsilon \end{cases}$$

where $\epsilon_d$ is the dead zone limit set to correspond to sensor noise and the allowable estimation error (if any), $\epsilon$ is the boundary layer limit set greater than $\epsilon_d$ to ensure smooth transition between minimum and maximum actuator force (thereby eliminating chatter), $\rho$ is the maximum available force at a given rattle space velocity, and $||B^T P X^e||$ can be referred to as the magnitude of the system state. When the controller output, $u_s$, is zero, the actuator force, u, is the minimum damping of the system, which may be zero or may follow a rattle space velocity dependent curve. When $u_s$ is $(B^T P X^e)\rho/||B^T P X^e||$, the actuator force u is the maximum actuator force of the system (in the semi-active case the maximum actuator force is a damping force and may be dependent upon rattle space velocity). When $u_s$ is $(B^T P X^e - ||B^T P X^e||\epsilon_d/(B^T P X^e))\rho/(\epsilon - \epsilon_d)$, the actuator force u is $(||B^T P X^e|| - \epsilon_d)/(\epsilon - \epsilon_d)$ percent between the minimum actuator force and maximum actuator force for the particular rattle space velocity.

Figure 6:
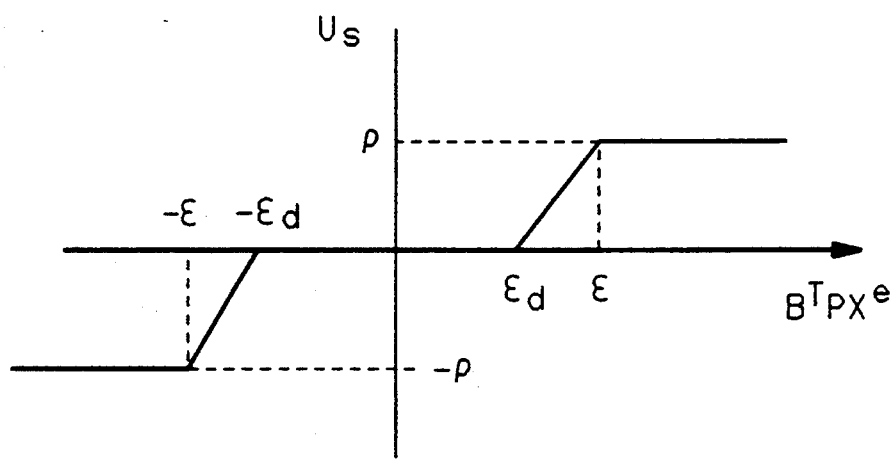
FIG. 6 is a graph of the output characteristics of the controller shown in FIGS. 5a and 5b.

The output of the controller is shown in FIG. 6. The dead band, between $-\epsilon_d$ and $\epsilon_d$ on the $B^T P X^e$ axis, represents minimum possible damping and eliminates detrimental effects of noise and estimation error on the system. The transfer regions between $-\epsilon$ and $-\epsilon_d$ and between $\epsilon$ and $\epsilon_d$ on the $B^T P X^e$ axis prevent chatter in the suspension system. The regions below $-\epsilon$ and above $\epsilon$ provide maximum available actuator force in the proper direction on the suspension system.

In implementation in a semi-active system, the controller 200 is stable as long as matrix A is stable because the force, u, is always a damping force. In implementation in an active system, the control parameter must be chosen correctly to maintain a stable system. Stability in the dead band is achieved as long as matrix A is stable. The transfer regions are stable as long as a matrix $(A - \rho B B^T P/(\epsilon - \epsilon_d))$ is stable. If the above two stabilities are met, then the maximum actuator force regions are stable.

In an example implementation of this invention with actuator 22 in FIGS. 3 and 4, the microcomputer 174 executes a control routine which estimates the system state and calculates the desired actuator command $u_s$. The signal on line PWM is pulse width modulated, preferably at a frequency of about 2 kHz, to provide the desired damping force. For example, if $||B^T P X^e|| \leq \epsilon_d$, then the duty cycle of the signal on line PWM is zero, resulting in zero power dissipation through resistor 46. If $||B^T P X^e|| \geq \epsilon$, then the duty cycle of the signal on line PWM is 100 percent, resulting in maximum dissipation of power in resistor 46. If $\epsilon_d < ||B^T P X^e|| < \epsilon$, then the duty cycle on line PWM is $(||B^T P X^e|| - \epsilon_d)/(\epsilon - \epsilon)$. As an optional feature, a measure of the actual damping force may be provided to the microcomputer through the signal on line I and may be used by the microcomputer in calculating the estimations at block 194. In actual practice, there may be some inherent damping in actuator 22 due to friction. This inherent damping may be either accounted for in the controller in relation to rattle space velocity, may be accounted for as part of $b_p$, or may be lumped in with the system error for purposes of this invention.

Figure 7A:
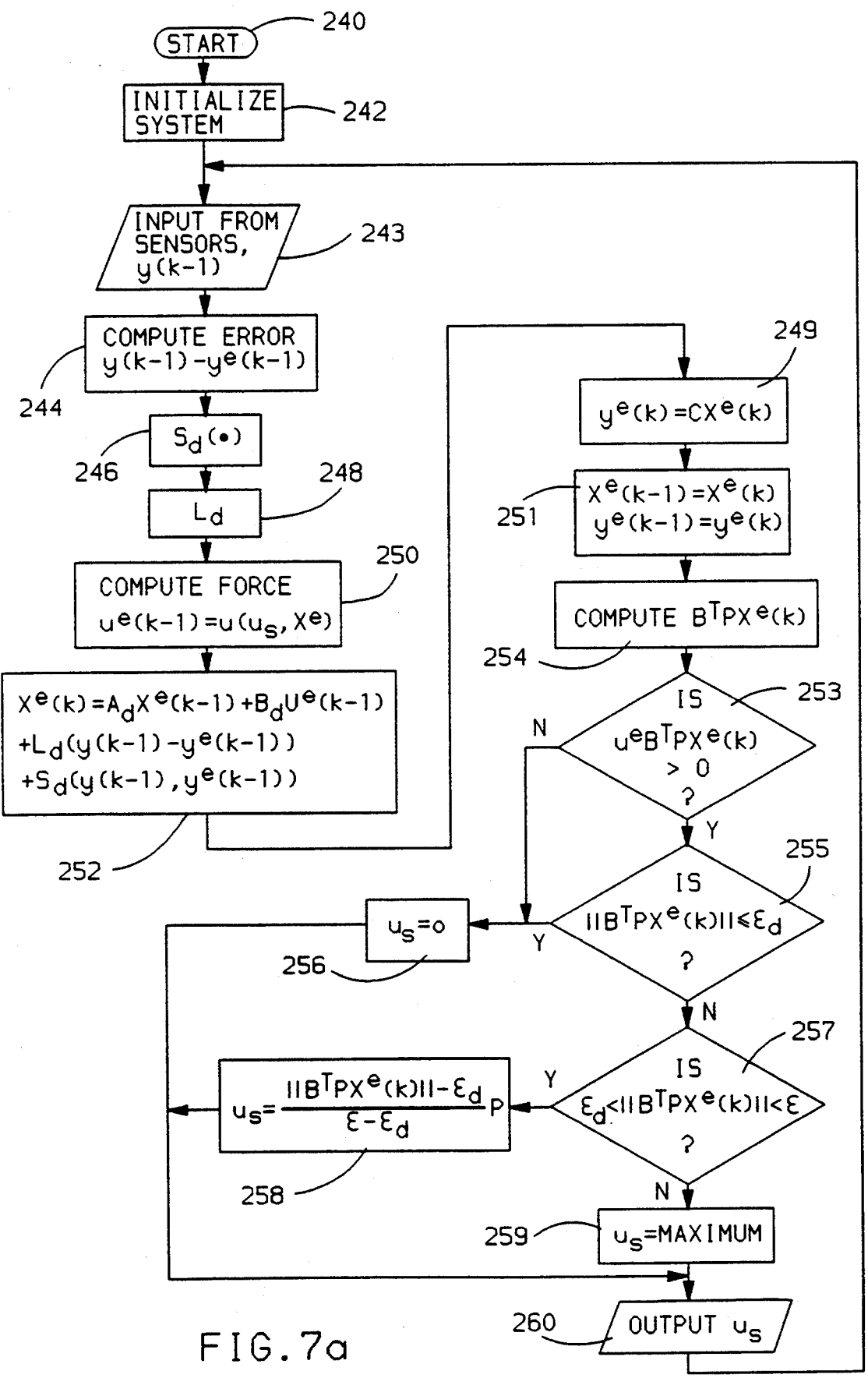
FIGS. 7a and 7b are flow diagrams for computer implementations of the observers of this invention.

The flow diagram of FIG. 7a is one example of a computer implementation of this invention. The program starts at block 240 and initializes the system at block 242 (startup only). During initialization, the computer assigns zeros as the standard initial values to the estimated system states, $X^e(k-1)$ and $y^e$ which are discrete representations of $X^e$ and $y^e(k-1)$, with k being the current time event and $k-1$ being the previous time event. Block 242 also assigns an initial value to the damping force signal, $u_s(k-1)$. At block 243, the controller receives the sensor input including a signal representative of the relative system state $y(k-1)$ and, at block 244, determines the error between the measured and the previously estimated relative system state signals, $y(k-1)-y^e(k-1)$. At block 246 the nonlinear term $S(y(k-1), y^e(k-1))$ is computed and at block 248 the Luenberger term is computed. At block 250, the damping force, $u(u_s(k-1), X^e(k-1))$, is determined from a three dimensional look-up table in response to $u_s(k-1)$ and $X^e(k-1)$ (or $X(k-1)$ if the measured relative system state includes relative velocity).

At block 252, the estimated system state $X^e(k)$, which is a discrete representation of $X^{e'}$, is computed by a discrete representation of the above described computations:

$$X^e(k)=A_d(k-1)+B_du(k-1)+L_d(y(k-1)-y^e(k-1))+S_d(y(k-1), y^e(k-1)),$$

where:
$A_d=e^{A\tau}$,
$B_d=\int_0^{96} e^{At}dtB$,
$L_d=\int_0^\tau e^{At}dtL$,
$S_d=\int_0^\tau e^{At}dtS$, and where $\tau$ is the time period between successive estimations of $X^e(k)$ and e is the natural log base. At block 249, the estimation of the relative suspension system state, $y^e(k)$, is computed, at block 251, $y^e(k-1)$ is set equal to $y^e(k)$ and at block 251, $X^e(k-1)$, the previous estimated system state, is set equal to $X^e(k)$ and $y^e(k-1)$ is set equal to $y^e(k)$. At block 254, the computer computes $B^TPX^e(k)$. At block 253, the computer computes the product of the force computed at block 250 and $B^TPX^e(k)$, and if the result is not greater than zero, $u_s$ is set equal to zero at block 256. This test determines if the present force $(u(k-1)=u(u_s(k-1), X^e(k-1)))$ is of proper direction, ensuring that the system operates only in the first and third quadrants as shown in FIG. 6 and is important because operation in the second and fourth quadrants could cause the system to become unstable or yield undesirable results; the product $u(k-1)B^TPX^e(k)$ is a signal indicating proper present actuator force direction if it is positive, and improper present actuator force direction if it is negative. (Note that in the case of a fully active suspension system, the calculated force at block 250 is of even greater importance, because, since active systems at times supply energy to the actuator, there is an even greater chance of system instability if operated in the second and fourth quadrants of FIG. 6.)

If the product at block 253 is greater than zero, then block 255 compares $||B^TPX^e(k)||$ to $\epsilon_d$. Block 256 sets $u_s$ to zero if $||B^TPX^e(k)||$ was less than or equal to $\epsilon_d$ at block 255. If $||B^TPX^e(k)||$ was not less than or equal to $\epsilon_d$ at block 255, then block 257 determines if $||B^TPX^e(k)||$ is between $\epsilon_d$ and $\epsilon$, if so, then block 258 computes $u_s$ as:

$$(B^TPX^e(k)-||B^TPX^e(k)||\epsilon_d/(B^TPX^e(k)))\rho/(\epsilon-\epsilon_d).$$

If $||B^TPX^e(k)||$ was not between $\epsilon_d$ and $\epsilon$ at block 257, then block 259 sets $u_s$ to command maximum possible actuator force. Block 260 outputs the command $u_s$, which controls actuator force, and returns to block 243 to repeat the loop.

Implementation of this invention into a suspension system results in suspension system control responsive to the entire suspension system state, enabling the increased controller response. The implementation illustrated above, results in a decrease in the magnitude of sprung mass displacement and velocity over the amount of sprung mass displacement and velocity in a passive suspension system. Sprung mass accelerations are also reduced. In the case of implementation of this invention into an active suspension, attitude control of the vehicle body is achievable. The amount of improvement will vary from implementation to implementation.

Figure 5B:
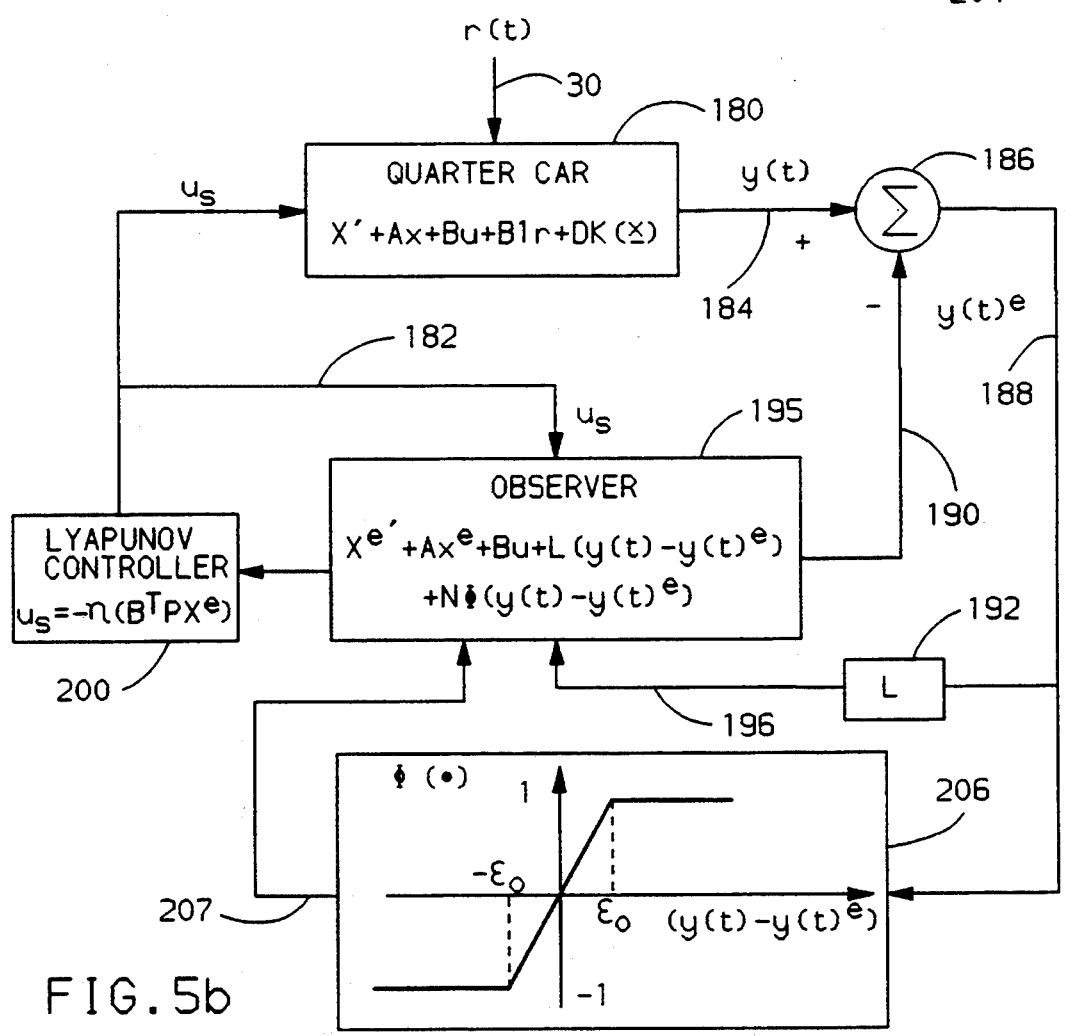

The observer 195 shown in FIG. 5b represents the preferred implementation of this invention. Referring to FIG. 5b, an estimated relative system state, $y^e(t)$, on line 190 is summed with the actual relative system state, $y(t)$, on line 184, to develop an error signal on line 188 as in FIG. 5a. As in the system of FIG. 5a, the error signal on line 188 is multiplied by a Luenberger matrix at block 192, and the result input into the alternative observer, represented by block 195. The nonlinear term of the model is computed at block 204 as set forth below.

The observer 195 estimates the state of the quarter car suspension system according to the model:

$$X^{e'}=AX^e+Bu+L(y(t)-y(t)^e)+N\Phi(y(t)-y^e(t)),$$

where the term, $\Phi(y(t)-y^e(t))$ (referred to below as $\Phi(.)$), is a saturation function and provides a stable nonlinear element to the model that guarantees that state estimations progress in the direction of a stable sliding surface, $y(t)-y^e(t)=0$, on an X, X' stability plot.

To further clarify the nonlinear function, assume the worst case (normal operation) road disturbance and other uncertainty effects on the suspension system can be represented by a term Ed, where d=1 for the worst case. One skilled in the art can easily determine E. Since, for the worst case d=1, for any given normal driving condition, $|d|\leq 1$. If N is set equal to EY, where $|y|\geq 1$, then a stable nonlinear function, $\Phi(y(t)-y^e(t))$, can be set up as follows:

$$\Phi(y(t) - y^e(t)) = \begin{cases} 1, & (y(t) - y^e(t)) \geq \epsilon_o \\ (y(t) - y^e(t))/\epsilon_o, & -\epsilon_o < (y(t) - y^e(t)) < \epsilon_o \\ -1, & (y(t) - y(t)e) \leq -\epsilon_o \end{cases}$$

where $\epsilon_o$ defines an error limit around the sliding surface $y(t)-y^e(t)=0$ within which the system is linearly stable and outside of which the system is non-linearly stable. To ensure nonlinear stability, all real parts of a function $H_1(\omega)$ must lie to the right of $-1/G$ on a real-/imaginary plot, where:

$$H_1(j\omega)=C(j\omega I-A+LC)^{-1}N,$$

and $$G = (1 + 1/Y)/\epsilon_o.$$

To ensure linear stability within the boundary layer defined by $||y(t) - y^e(t)|| < \epsilon_o$, the following matrix must be stable:

$$[A - (L + N/\epsilon_o)C].$$

To optimize the system assume a high Y and a low $\epsilon_o$, and adjust $\epsilon_o$ until the system is stable. If the system cannot be stabilized, lower Y and again adjust $\epsilon_o$. In general, a smaller $\epsilon_o$ corresponds to a smaller allowable error. Repeat the adjustment of Y and $\epsilon_o$ until an optimum stable system is found. It is preferable to find several stable combinations of Y and $\epsilon_o$ and to pick the system which yields the smallest estimation errors.

With the above information, one skilled in the art can easily implement the nonlinear term $N\Phi(.)$ to achieve a stable system. During normal driving conditions, the resulting control system is linearly stable and the estimated system state can converge to the actual system state (zero error condition). During driving conditions such as a wheel hitting a large pothole or a large rock, the control system is non-linearly stable and progresses to a state where it is linearly stable.

Figure 8:
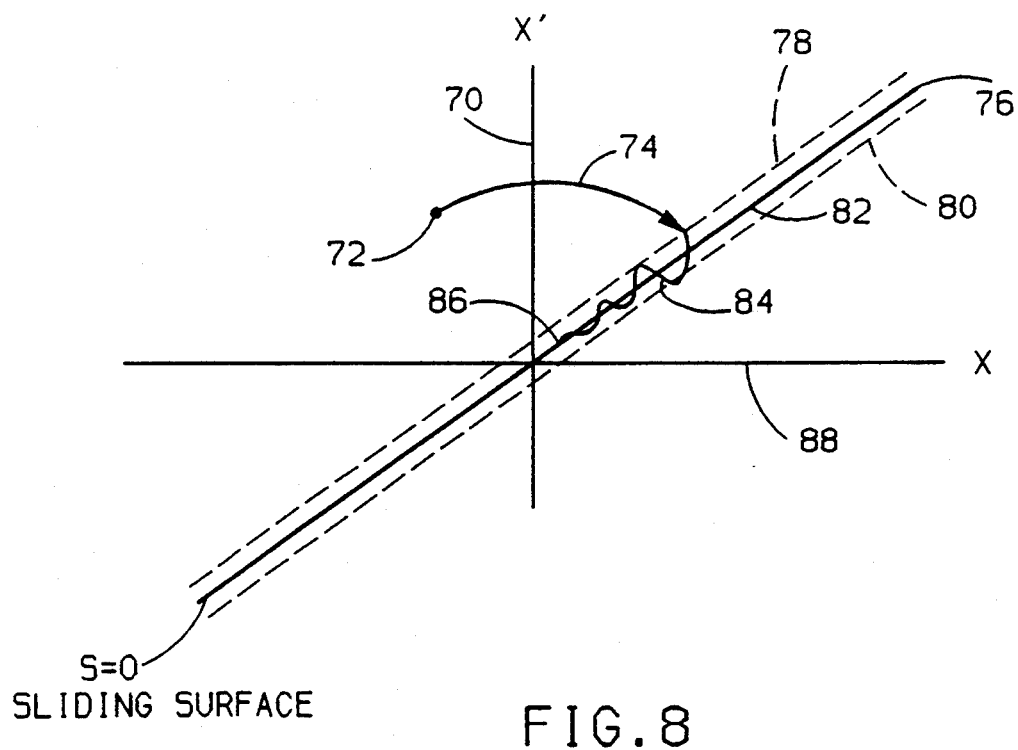
FIG. 8 is a sliding surface plot illustrating the operation of one implementation of this invention.

FIG. 8 is an illustrative example of how the stable observer achieves accurate estimations. Line 76, referred to as a sliding surface, on the X and X' axes, 88 and 70, represents the actual suspension system state. Whenever state estimated by observer 195 falls on sliding surface 76, the estimation error is zero. Assume a large disturbance on the suspension system causes state estimation error, the estimated state represented by point 72, not on the sliding surface 76. When this occurs, the saturation function saturates the state estimations in a manner to cause the state estimations to return toward the sliding surface 76 along a path, such as path 74. In this mode, the observer is acting non-linearly. Once the state estimation is within a boundary shown as dotted lines 78 and 80 (corresponding to $\epsilon_o$) of the sliding surface 76, the observer is linear and the state estimations oscillate along path 84 until the estimated states converge with the actual state at point 86. An important feature of this control method is that the estimation error is guaranteed to go to zero without having to satisfy a matching condition in the design phase of the system.

The output of the observer 195, on line 198, is input into the modified Lyapunov controller 200. The modified Lyapunov controller 200 determines the desired force command, $u_s$, in response to the estimated state on line 198 as described above.

Figure 7B:
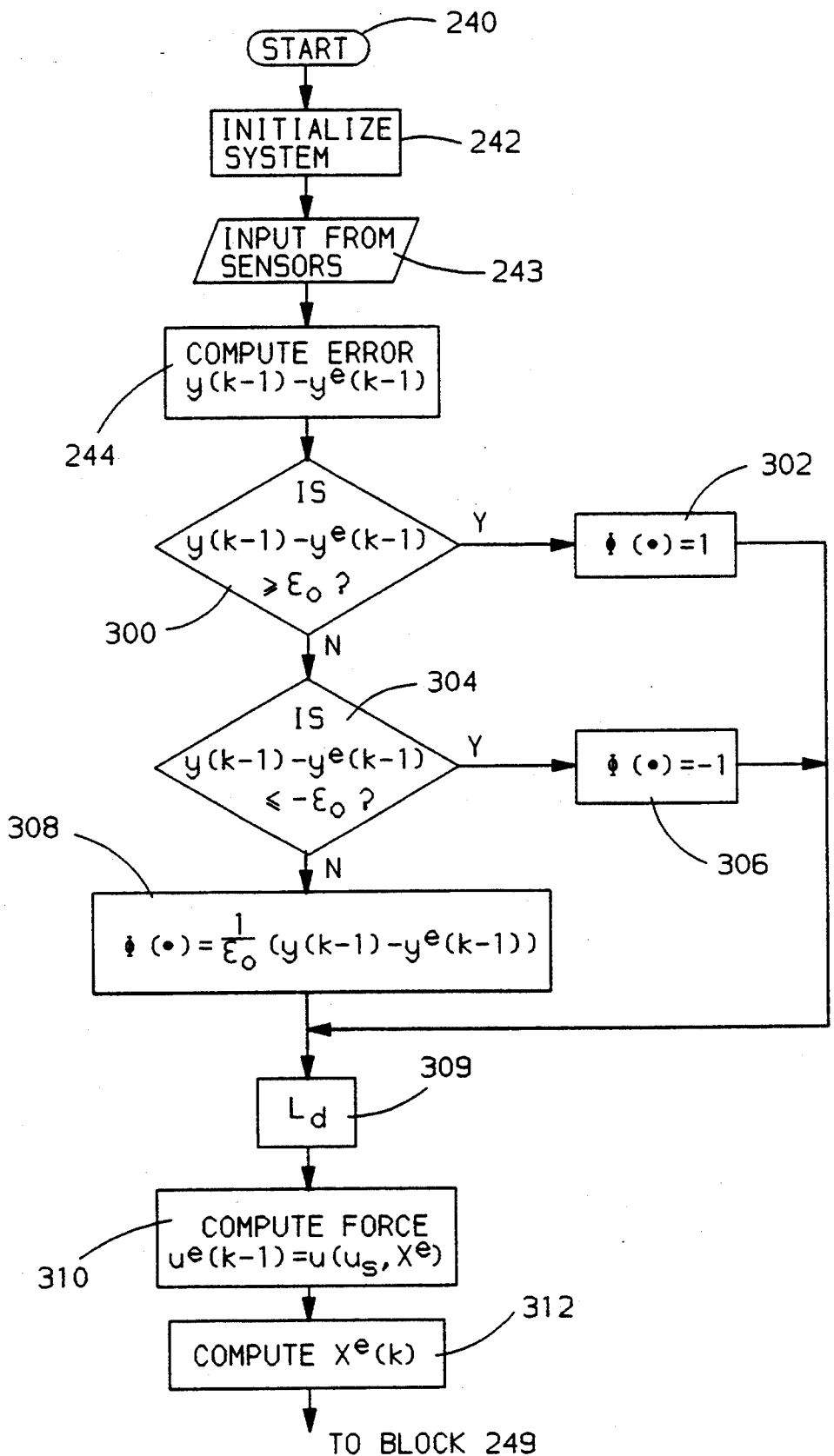

The flow diagram of FIG. 7b represents one example of a computer implementation of the observer and controller of FIG. 5b. Blocks 240 through 244 are as described above with reference to FIG. 7a. Block 300 compares $y(k-1) - y^e(k-1)$ to $\epsilon_o$. If $y(k-1) - y^e(k-1)$ is greater than or equal to $\epsilon_o$, then block 302 sets $\Phi(.) = 1$. If $y(k-1) - y^e(k-1)$ is less than $\epsilon_o$, then block 304 compares $y(k-1) - y^e(k-1)$ to $-\epsilon_o$. If $y(k-1) - y^e(k-1)$ is less than or equal to $-\epsilon_o$, then block 306 sets $\Phi(.)$ equal to $-1$. If $y(k-1) - y^e(k-1)$ is between $-\epsilon_o$ and $\epsilon_o$, then block 308 sets $\Phi(.)$ equal to $(y(k-1) - y^e(k-1))/\epsilon_o$. The Luenberger term is computed at block 309 and force, $u(u_s(k-1), x^e(k-1))$, is computed at block 310 as described above with reference to FIG. 7a. Block 312 computes $X^e(k)$, discretely, as follows:

$$X^e(k) = d(k-1) + B_d u(k-1) + L_d(y(k-1) - y^e(k-1)) + N_d \cdot \Phi(y(k-1) - y^e(k-1)),$$

where:

$$N_d = {}_0\int^{\tau} e^{At} dt N.$$

The computer then performs the rest of the control routine as described with reference to FIG. 7a, starting at block 249.

For best mode purposes, a system of integrating four quarter car semi-active suspension systems implementing this invention into one vehicle is set forth below. This integrated system is the subject of related copending patent application.

When using this invention in a vehicle, it is important to note that the present state of each quarter car suspension system and the road input are not the only factors that operate on each suspension system. The suspended mass of a vehicle is a semi-rigid body and the motion of each portion of the suspended mass generally affects the other portions of the suspended mass. The semi-rigid body motions of primary concern in a vehicle are heave, pitch and roll. Heave can be adequately controlled by four quarter car controllers described above. However, for improved control of pitch and roll, it may be desirable to take into account the semi-rigid nature of the entire sprung mass of the vehicle.

Figure 9:
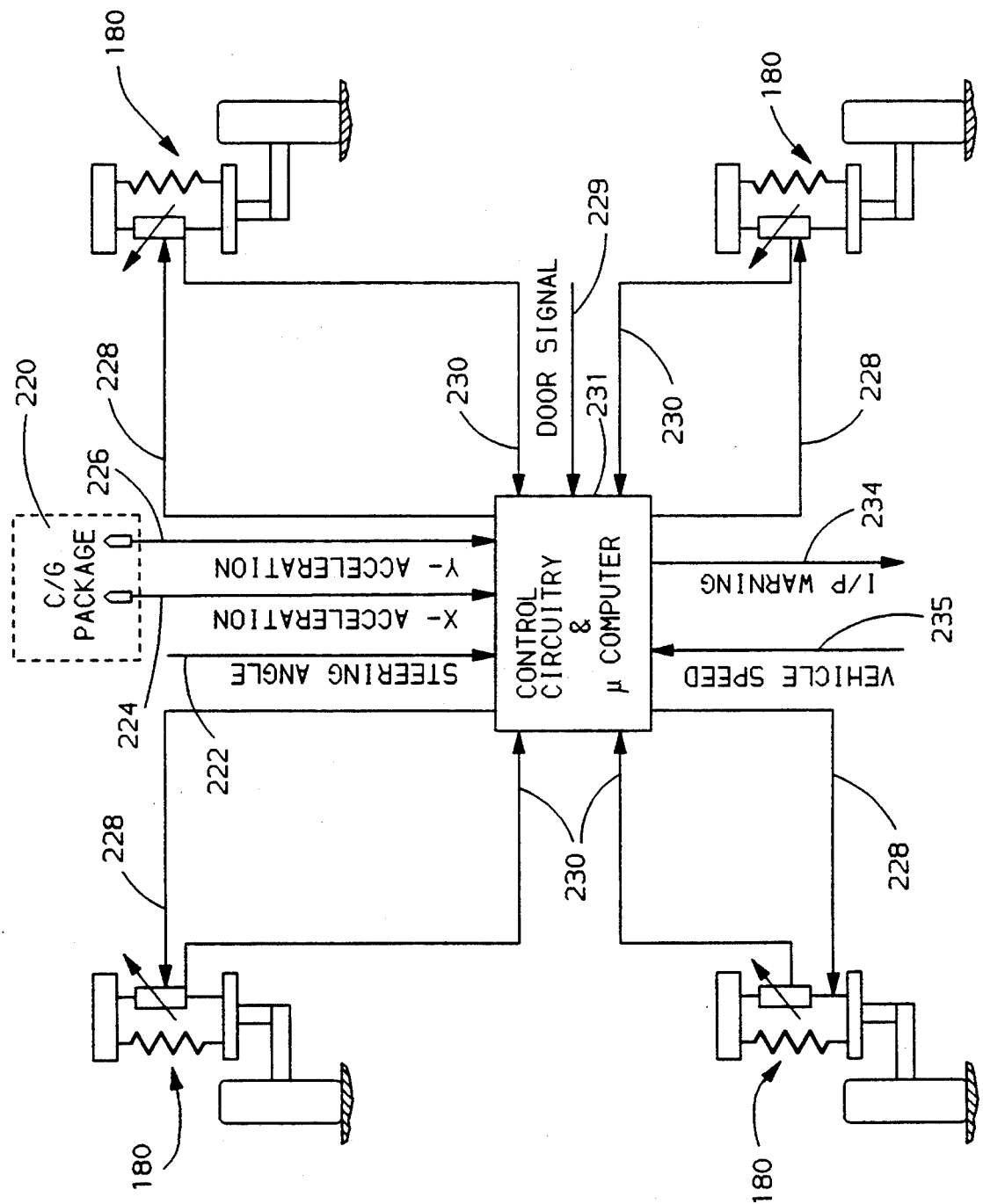
FIG. 9 is a schematic diagram showing four quarter car semi-active suspension systems integrated into one vehicle.

Referring to FIG. 9, the integrated semi-active suspension system includes four quarter car suspensions 180 including variable force actuators. Signals indicative of the relative system state (rattle space velocity or relative position between the sprung and unsprung masses) of each quarter car suspension are provided to the controller 231 through lines 230. Signals representative of forward acceleration and lateral acceleration are provided to the controller 231 through lines 224 and 226, respectively, from transducers in a package 220 located at the vehicle center of gravity. Alternatively, package 220 may be offset from the center of gravity of the vehicle with the offset taken into account to compute the forward and lateral acceleration of the vehicle. These computations are easily implemented by one skilled in the art. Although pitch and roll and yaw rate may be taken into consideration, they are not considered necessary because a significant portion of vehicle pitch and roll deviations result from forward and lateral accelerations of the vehicle body and yaw rate is not significantly affected in a semi-active suspension system. Therefore, for the sake of simplicity, it is preferable that only forward and lateral acceleration be taken into account.

One alternative implementation for determining forward and lateral acceleration is to have signals indicative of steering wheel angle and vehicle speed on lines 222 and 235 from a rotary (RVDT) sensor (or equivalent) on the steering column and the vehicle speedometer signal (not shown) input into the controller 231. The controller 231 can determine forward acceleration through differentiation of the vehicle speed signal. For example, forward acceleration, $A_f(k)$, may be determined as follows:

$$A_f(k) = (v(k) - v(k-2))/(2\Delta\tau),$$

where v(k) is the current vehicle speed, v(k−2) is the vehicle speed two time events previously, and $\Delta\tau$ is one time event. Lateral acceleration can be determined in the controller from the vehicle speed and steering wheel angle through the following model, easily implemented by one skilled in the art:

$$a_y = v^2 g \delta / (r_s(gL + K_{us}v^2))$$

where $a_y$ is the lateral acceleration of the vehicle, v is the vehicle velocity, g is gravitational acceleration, $\delta$ is the steering wheel angular displacement, $r_s$ is the steering gear ratio, L is the wheel base, and $K_{us}$ is the understeer coefficient. To reduce noise from the vehicle speed signal, v, the signal may be filtered through a low pass digital filter before the lateral acceleration is computed.

In the controller 231, determinations of forward and lateral acceleration are used to determine a minimum damping command, correlating to minimum damping forces, for the four quarter car suspensions. The greater the forward and/or lateral accelerations, the greater the minimum damping command. The controller 231 also estimates a state and determines a damping command for each quarter car suspension system as described above. The computer selects between the minimum damping command and the individual quarter car damping command for each quarter car system and issues a damping command through line 228 corresponding to the command which requires greater damping. By controlling the minimum damping as described above, deviations in pitch and roll can be minimized, providing increased road stability to the vehicle.

Figure 10:
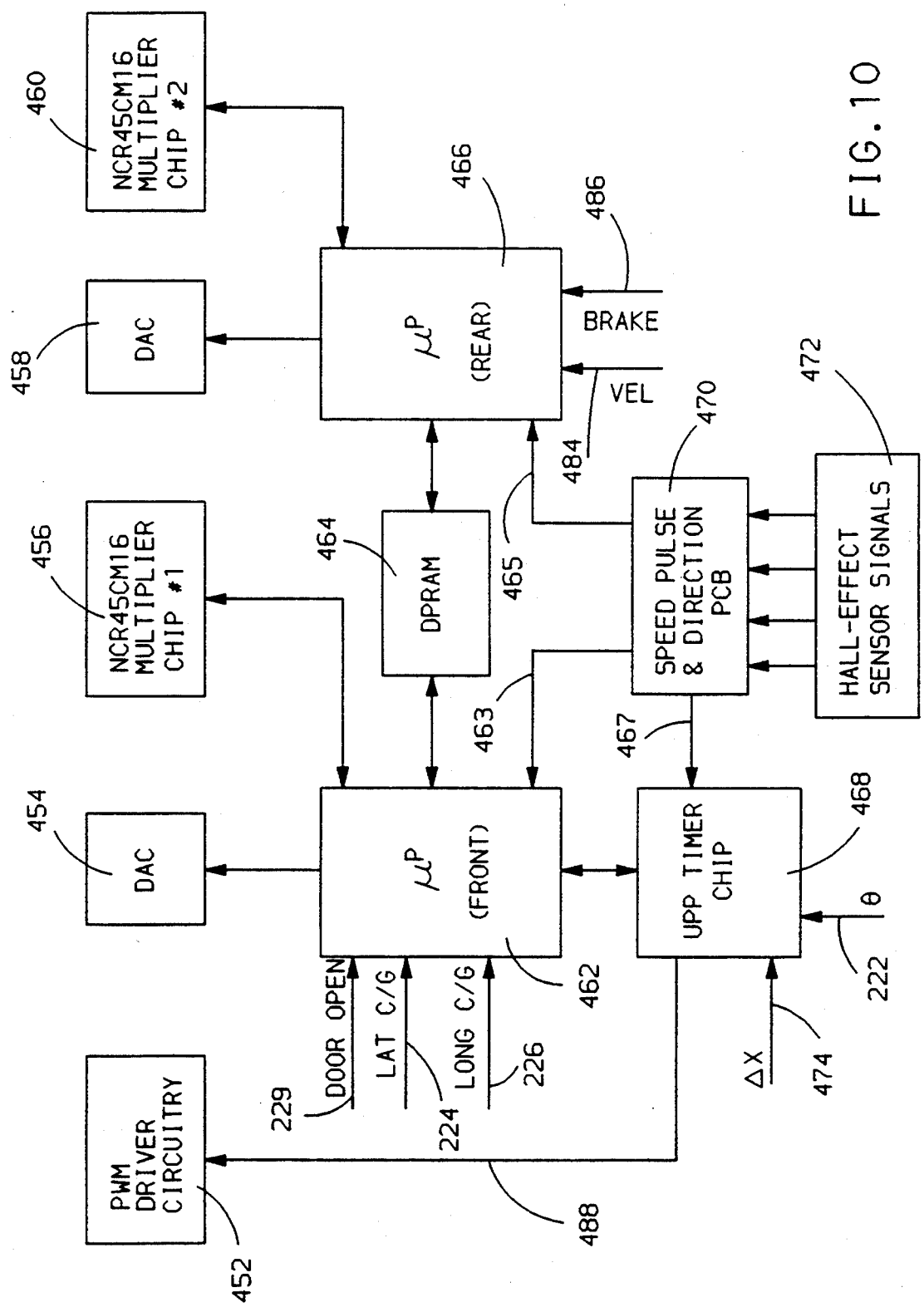
FIG. 10 is a detailed block diagram of the controller circuitry shown in FIG. 9.

The controller circuitry 231 is shown in more detail in FIG. 10 and includes two eight bit microprocessors 462 and 466 (68CH11s may be used for low cost), one computing the individual quarter car commands for two quarters of the vehicle, the other computing the individual quarter car commands for the other two quarters of the vehicle. In the illustration, microprocessor 462 computes the commands for the front two suspension and microprocessor 466 computes the commands for the rear two suspensions. Each microprocessor 462 and 466 runs the integration routine computing the minimum damping command. Dual port RAM 464 is used to exchange data between the two microprocessors. Each microprocessor 462 and 466 is interfaced with a math co-processor chip (456 and 460) to speed the computing power of the circuitry.

Each actuator 22a may contain three hall effect sensors which may be used to determine rattle space velocity and/or direction of rattle space movement. Block 472 represents the sensors in each quarter of the vehicle, and the signal are fed to speed pulse and direction circuitry that provides frequency and direction signals. A frequency signal is provided for each quarter car by combining the signals from the three hall effect sensors from the actuator in that quarter car suspension unit. The frequency of the resultant signal for each quarter car represents the magnitude of the rattle space velocity of that quarter car suspension and is coupled to the microprocessors 462 and 466 through UPP timer chip 468, through bus 467.

The rattle space velocity magnitude signals are received by microprocessor 462 from chip 468, and the rear velocity signals are provided to processor 466 through dual port RAM 464. The rattle space velocity directions is determined in relation to the order of signals from the hall effect sensors in each actuator and are provided directly to the microprocessors 462 and 466 through buses 463 and 465.

Although the hall effect sensors may be preferable in certain sensors, they are not necessary. Signals on bus 474, representing the relative displacement of the sprung and unsprung masses in each suspension unit may be fed to the UPP timer chip, and related therethrough to microprocessor 462, and through microprocessor 462 and dual access RAM 464 to microprocessor 466. Rattle space velocity and direction may be estimated from the relative displacement information using observer 194 or observer 195 (FIGS. 5a and 5b).

A steering wheel angle signal (line 222) is also fed to the UPP timer chip, which provides the information for the microprocessors 462 and 466. Sensor information such as a door open signal and lateral and longitudinal acceleration signals may be fed directly to microprocessor 462 through lines 229, 24 and 226. The vehicle velocity signal and break signal may be fed directly to microprocessor 466 through lines 484 and 486.

With the information provided, microprocessor 62 computes the damping commands for the front two suspensions and feeds the commands to UPP chip 468. Microprocessor 466 computes the damping commands for the rear two suspensions and feeds the commands to dual port RAM 464, where it is read by microprocessor 462 and fed to UPP chip 468. UPP chip 468 outputs pulse width modulated commands to each quarter car suspension through lines such as line 488, coupled to the PWM driver circuitry 452 for each quarter car suspension system.

Microprocessors 462 and 466, in conjunction with math co-processors 456 and 460, compute new individual quarter car commands every 2 ms and a new minimum damping command every 20 ms.

If this invention is to be implemented into a fully active system, microprocessor 462 outputs force commands for the front suspension to D/A converter 454, which outputs a signal used to drive motor control circuitry, providing the desired force for the front two suspensions. Likewise, microprocessor 466 outputs force commands for the rear suspension to D/A converter 458, which outputs a signal used to drive motor control circuitry for the rear two suspensions.

When this invention is implemented into an integrated vehicle system, various other factors should be taken into account. For example, when persons get into and out of the vehicle and when cargo is loaded to and unloaded from the vehicle, the sprung mass of the vehicle changes and the at-rest state of each quarter car suspension system changes (e.g., the distance between the sprung and unsprung masses when the vehicle is at rest changes). If only the relative velocity of the sprung and unsprung masses are measured, then the system automatically resets the at rest state with changes of vehicle load. If the relative position of each sprung and unsprung mass is measured, a line 229 can be implemented to receive a vehicle door signal indicating when a door has been opened and closed. An easy implementation for this line is to wire it into the dome light circuit in the vehicle. When the computer senses that a door has just been closed, it reinitializes the suspension system control, to set the new at-rest state of each quarter car suspension system as the reference state. A similar feature may also be implemented with a signal detecting opening and closing of a vehicle trunk.

Although the sprung mass of the vehicle changes as passengers and cargo of the vehicle change, the control methods shown herein can robustly control the suspension system without changing the model parameters at every change in the sprung mass. However, if an LVDT position sensor is used to measure the relative distance between the sprung and unsprung mass 12 and 24 (FIG. 1), then new at rest state can be used to determine the amount of mass in the vehicle, e.g., the greater the at rest distance between the sprung and unsprung masses, the smaller the sprung mass. The model parameters of matrices A and B can be adjusted accordingly. Although altering the matrices A and B may be desirable in certain implementations, it is not necessary.

If the computer detects a failure of the suspension control, e.g., zero current on line I (see FIG. 4) when the damper is commanded to have full damping, then a signal is sent through line 234 to an instrument panel warning light (not shown) to notify the vehicle operator.

Another optional feature that may be implemented with this invention is to command full damping at vehicle acceleration from a rest position to compensate for possible delays in receiving the speed signal that occur in some systems. This command can be triggered by change in throttle position, gear shift to drive, vehicle door closing, or any parameter which indicates the vehicle might launch. Once the speed signal is sensed, damping is controlled as described above. A signal from the brake pedal can be used to indicate vehicle braking without computational delays.

Figure 11:
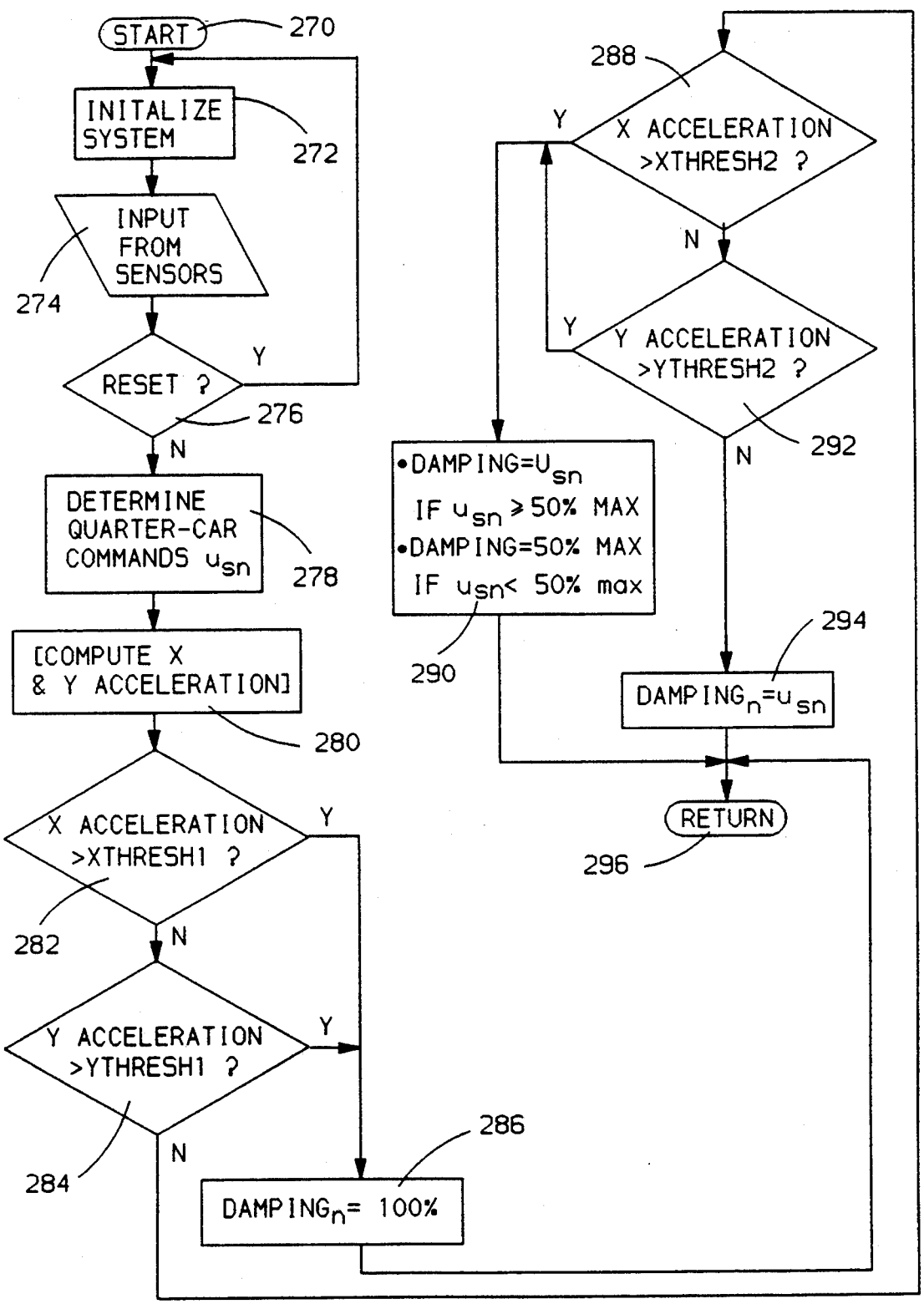
FIG. 11 is a flow diagram for a computer implementation of a logic routine for integrating into a vehicle four quarter car suspension systems implementing this invention.

The flow diagram in FIG. 11 is one example of a flow diagram for computer implementation of the vehicle integration routine. The routine starts at block 270 and initializes at block 272, including determining the at rest state of each quarter car suspension. Sensor data is received at block 274 and block 276 determines if the system needs to be reinitialized, e.g., if a door was just opened or closed. At block 278, each of the quarter car commands, $u_s$, is determined as described above. At block 280, forward and lateral accelerations are computed if necessary, e.g., if the center of gravity package is offset or if the vehicle speed and steering angle are used to determine forward and lateral acceleration.

Blocks 282 and 284 determine if forward or lateral acceleration is above a first threshold, e.g., 0.5 G, if so, the minimum damping command is set at block 286 to 100% of the maximum damping available. Blocks 288 and 292 compare forward and lateral acceleration to a second threshold, which is less than the first threshold, e.g., 0.3 G. If the forward or lateral acceleration is greater than the second threshold, but wasn't greater than the first threshold, then the minimum damping is set at block 290 to, for example, 50% of the maximum available damping. If neither the forward nor lateral accelerations is greater than the first or second thresholds, then the damping command for each quarter car 180 is set, at block 294, equal to the command $u_s$ determined for that quarter car in accordance with the methods set forth above.

With the above implementation, this invention is used to improve the driving performance of a vehicle based, not only on the individual state of each quarter car suspension, but on the effect of the whole suspended body of the vehicle.

Figure 13:
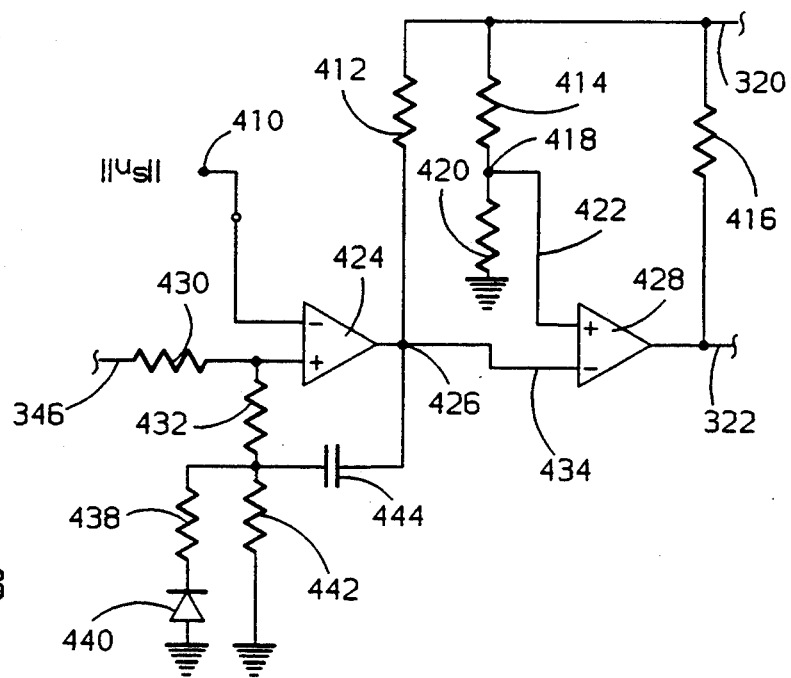

The circuit diagrams of FIGS. 12 and 13 illustrate one example of hardware useful for implementation of this invention into a quarter car active suspension. The functioning of this circuitry is explained in detail in U.S. Pat. No. 4,544,868, to Murty, which is assigned to the assignee of this invention and incorporated into this specification by reference.

The actuator 22 is a three phase brushless DC motor comprising coils 340, 358, and 360 with lines A, B, and C, permanent magnet rotor 364 and Hall effect sensors 344, 362, and 366. The Hall effect sensors are coupled to the vehicle positive voltage supply, $V_{cc}$, line 320, through pull-up resistors 324, 326, and 328. Signals from the Hall effect sensors 344, 362, and 366 on lines 336, 338, and 330 are provided to the $A_0$, $A_1$, and $A_2$ address inputs of ROM 334.

ROM 334 controls the standard transistor bridge driver circuits 350, which drive the transistor bridge circuit comprising transistors 372, 373, 374, 375, 376, and 377, through lines 348, 349, 353, 354, 356, and 352, respectively. The ROM outputs $D_0$ through $D_5$ contain the brushless motor driving commands stored in memory addresses accessed through the address inputs $A_0$ through $A_4$. The address inputs $A_0$–$A_4$ selectively control the energizing of coils 340, 358, and 360 of the actuator by selectively engaging bridge transistors 373–377, which are connected to the positive side of the vehicle battery 368 and coupled to the negative side of the battery 368 through current sensing resistor 394. The address inputs $A_0$–$A_2$ indicate the position of the rotor 364. Address input $A_3$, connected to line $V_d$, controls the direction of rotational force desired of the actuator 22. Through the signals on address inputs $A_0$–$A_3$, it is known which coils are desired to be energized. Line 322, connected to address input $A_4$, contains a pulse width modulated signal that determines when power is to be applied to actuator 22. Controlling the duty cycle of the signal on line 322 controls the amount of power to be applied to actuator 22.

Actuator 22 is also a generator which generates power when it is rotated but not energized by a command on line 322. when the relative movements of the sprung and unsprung masses cause rotational movement of rotor 364, but line 322 does not signal for power to be input to the actuator 22, power generated through coils 340, 358 and 360 is rectified by diodes 370, 371, 378, 392, 396, and 398, and charges the vehicle battery 368.

The PWM circuit 332, shown in detail in FIG. 13, provides the signal on line 322 for address input $A_4$ and is described in detail in U.S. Pat. No. 4,544,868. Referring to FIG. 13, a force magnitude command, in terms of a voltage signal, is provided on line 410. The signal on line 410 is compared to the signal indicative of actuator force on line 346. The signal on line 346 acts as feedback indicative of actual actuator force by measuring the current, $i_m$, through resistor 394, which controls the voltage on line 346 in proportion to the current $i_m$. The signal on line 346, coupled to the operational amplifier 424 through resistor 430, is compared to the signal on line 410. The rest of the PWM circuit comprising resistors 412, 414, 416, 420, 432, 438 and 442, capacitor 444, diode 440, and operational amplifier 428 provide a PWM signal on line 322 corresponding to the error between actual actuator force and the desired actuator force on line 410.

In implementation of this invention with the circuitry of FIGS. 11 and 12, a microprocessor based controller 321 computes the suspension system state as described above with reference to FIGS. 5a and/or FIG. 5b. The controller then develops an actuator force command and applies that command to the actuator control circuitry through lines $V_d$ and 410. The signal on line 410 is a voltage signal developed by the microcomputer, interfaced through a D/A converter and is indicative of the magnitude of the desired actuator force. The signal on line $V_d$ is either a one or a zero depending on the desired direction of the force to be applied by the actuator 22. For example, the signal on line $V_d$ may be zero if $u_s||u_s||=1$ and one if $u_s||u_s||=1$. using the above description, those skilled in the art can easily implement this invention to control an active quarter car suspension.

The above descriptions are example implementations of this invention using the electromechanical machine of actuator 22. This invention is not limited to the use of electromechanical actuators but may be used to observe the state of and to control any variable force suspension system which is controllable between at least two force states, as described above. Additionally, the methods and apparatus for determining actuator control set forth above are the preferred implementations and are not limiting on this invention. This invention encompasses the use of any suitable means for determining the actuator force control signal in response to the estimated quarter car state that is estimated by the observer of this invention. For purposes of this invention, any means for generating an actuator control signal in response to at least part of the estimated quarter car state is considered equivalent to the implementations set forth above.

As can be seen through the examples set forth above, the apparatus and method of this invention provide a suspension control system responsive to the entire system state. As is apparent to those skilled in the art, the implementations set forth above are illustrative examples and are not limiting on this invention, the scope of which is set forth below.

The embodiments of the invention in which an exclusive property or privilege is claimed are defined as follows:

1. A method for controlling a variable-force suspension system comprising the steps of:
    estimating a quarter car state, the estimated quarter car state having linear and nonlinear components including: (i) a component linearly related to a previous quarter car state estimation, (ii) a component linearly related to actuator force in the suspension system, (iii) a component linearly related to error between the previously estimated relative suspension system state and a measured relative suspension system state and (iv) a component nonlinearly related to error between the previously estimated relative system state and the measured relative suspension system state, the linear and nonlinear components maintaining stability so that the estimated system state is substantially equal to the actual system state;
    determining an actuator force control signal responsive to the estimated quarter car state; and
    applying the actuator control signal to control the variable force suspension.

2. A quarter car suspension system controller responsive to a signal representative of a state of the quarter car suspension system, the quarter car suspension system state signal including (i) a component linearly related to a previous quarter car state estimation, (ii) a component linearly related to actuator force in the quarter car suspension system, (iii) a component linearly related to error between the previously estimated relative suspension system state and a measured relative suspension system state and (iv) a component non-linearly related to error between the previously estimated relative suspension system state and the measured relative suspension system state, the linear and nonlinear components maintaining stability so that the suspension system state signal comprises a substantially accurate estimation of the suspension system state.

3. The quarter car suspension control system of claim 2 wherein the linear relation of the component linearly related to error between the previously estimated relative suspension system state and measured relative system state consists of a Luenberger matrix.

4. The controller of claim 2 wherein the state of the suspension system comprises (i) position of a sprung mass, (ii) position of an unsprung mass, (iii) velocity of the sprung mass, and (iv) velocity of the unsprung mass.

5. The controller of claim 2 wherein the suspension system includes an electromechanical machine.

6. The controller of claim 2 wherein the non-linear relation is a modified signum function.

7. The controller of claim 2 wherein the non-linear relation is a saturation function.

8. A control system for a vehicle suspension comprising:
    means for measuring a relative state of the suspension system and developing a signal representative of the relative suspension system state;
    means for developing an error signal representative of error between the relative suspension system state signal and a previous estimation of the relative suspension system state;
    means for developing a linear correction signal responsive to the error signal;
    means for developing a nonlinear correction signal responsive to the error signal;
    means for developing a signal representative of actuator force on the suspension;
    means for developing an estimation of a suspension system state, responsive to a linear relation to a previous suspension system state, a linear relation to the actuator force signal, the linear correction signal, and the nonlinear correction signal;
    means for developing an estimation of the relative suspension system state responsive to a linear relation to the suspension system state estimation; and
    means for controlling the suspension system in response to the estimated suspension system state.

* * * * *